United States Patent
Berg et al.

(10) Patent No.: US 6,782,470 B1
(45) Date of Patent: Aug. 24, 2004

(54) OPERAND QUEUES FOR STREAMING DATA: A PROCESSOR REGISTER FILE EXTENSION

(75) Inventors: Stefan G. Berg, Seattle, WA (US); Michael S. Grow, Sammamish, WA (US); Weiyun Sun, Vancouver, WA (US); Donglok Kim, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 582 days.

(21) Appl. No.: 09/706,899

(22) Filed: Nov. 6, 2000

(51) Int. Cl.[7] ............................................... G06F 9/34
(52) U.S. Cl. ........................... 712/225; 712/2; 712/4; 712/7; 712/222
(58) Field of Search ........................... 712/2, 4, 7, 222, 712/225

(56) References Cited

U.S. PATENT DOCUMENTS 6,192,384 B1 * 2/2001 Dally et al. .................. 708/200

OTHER PUBLICATIONS

Berg et al; "Critical Review of Programmable Mediaprocessor Architectures," SPIE Proceedings, vol. 3655, pp 147–156, 1999.
McKee et al., "Smarter Memory: Improving Bandwidth for Streamed References," IEEE Computer, vol. 31, No. 7, pp. 54–63, 1993.
Rathman et al., "Processing the New World of Interactive Media," IEEE Signal Processing, vol. 15, No. 2, pp. 108–117, 1998.
Basoglu et al., "Single–Chip Processor for Media Applications: The MAP1000" Intl Journal of Imaging Systems and Technology, vol. 10, pp. 96–106, 1999.
N. Jouppi, "Improving Direct–Mapped Cache Performance by the Addition of a Small Fully–Associative Cache and Prefetch Buffers," International Symposium on Computer Architecture, pp. 364–373, May 1990.
Palacharla et al., "Evaluating Stream Buffers as a Secondary Cache Replacement," Intl. Symposium on Computer Architecture, pp. 24–33, 4/94.

* cited by examiner

Primary Examiner—William M. Treat
(74) Attorney, Agent, or Firm—Steven P. Koda

(57) ABSTRACT

The register file of a processor includes embedded operand queues. The configuration of the register file into registers and operand queues is defined dynamically by a computer program. The programmer determines the trade-off between the number and size of the operand queue(s) versus the number of registers used for the program. The programmer partitions a portion of the registers into one or more operand queues. A given queue occupies a consecutive set of registers, although multiple queues need not occupy consecutive registers. An additional address bit is included to distinguish operand queue addresses from register addresses. Queue state logic tracks status information for each queue, including a header pointer, tail pointer, start address, end address and number of vacancies value. The program sets the locations and depth of a given operand queue within the register file.

21 Claims, 2 Drawing Sheets

OPERAND QUEUES FOR STREAMING DATA: A PROCESSOR REGISTER FILE EXTENSION

BACKGROUND OF THE INVENTION

This invention relates to processor architecture and image processing applications, and more particularly to the register file(s) in a mediaprocessor.

Built-in parallelism in superscalar and Very Long Instruction Word ('VLIW') architectures allows mediaprocessors, such as Philips Trimedia processor and Hitachi/Equator Technologies MAP, to perform multiple operations per clock cycle. The multimedia data processed by these mediaprocessors are typically supplied by streams of data. A stream is a sequence of data with predictable addresses. This attribute makes a stream a good candidate for cache prefetching.

Processing these streams in a cache-based system, however, is inefficient for two main reasons. First, many data streams have little temporal locality. For example, a video data stream is not used again in many cases. This makes placing them in a data cache wasteful. Second, many streams have a non-unit stride, which results in transferring the data to the cache and never referencing much of the data. Stride is the distance between successive steam elements.

One method of improving cache performance is to place prefetched data into stream buffers instead of the cache. One kind of a stream buffer is a FIFO prefetch buffer, which holds consecutive cache blocks. If a memory address produces a miss in the cache but a hit in the stream buffer, the data are moved from the stream buffer into the cache instead of having to go out to the external memory. Since many algorithms use multiple streams at a time, multi-way stream buffers have been developed. Multiway stream buffers are a group of stream buffers in parallel, which allow multiple streams to be prefetched concurrently. FIG. 1 shows a typical architecture with stream buffers.

The stream buffers discussed above require a large additional silicon area for storing the streamed data. In addition, the storage area of unused queues is wasted. Accordingly, there is need of a more efficient and effective architecture for handling streams of data.

SUMMARY OF THE INVENTION

According to the invention, a processor includes a register file with a dynamically configurable operand queue extension. The register file is configured by a user's application program into registers and operand queues. The program designer determines how the register file is to be configured. Specifically, the programmer determines the trade-off between the number and size of the operand queue(s) versus the number of registers to be available to the program.

According to one aspect of the invention, all or a portion of the register file is allocatable into registers, and a portion of the register file is allocatable into zero or more operand queues. In one embodiment an additional address bit is used for each register address to define whether it is functioning as a register or part of an operand queue.

According to another aspect of the invention, the application program sets the locations and depth of each operand queue within the register file. A given queue occupies a consecutive set of registers, although multiple queues need not occupy consecutive registers.

According to another aspect of the invention, queue state logic maintains operand queue status information, such as a header pointer, tail pointer, start address, end address and number of vacancies for a given operand queue.

According to an advantage of this invention, by implementing the operand queues as a configuration of registers in the register file the size of the queue can be optimized for efficient use of silicon. Wasted area as for conventional stream buffers is avoided. The number of queues and the depth of each queue can vary, (e.g., one function may need three queues each with a depth of ten while another function may need five queues each with a depth of six). Furthermore, in the case where no queues are needed, there is no silicon sitting unused since the operand queue memory can be used for general-purpose registers.

These and other aspects and advantages of the invention will be better understood by reference to the following detailed description taken in conjunction with the accompanying drawings.

DESCRIPTION OF SPECIFIC EMBODIMENTS

Figure 1:
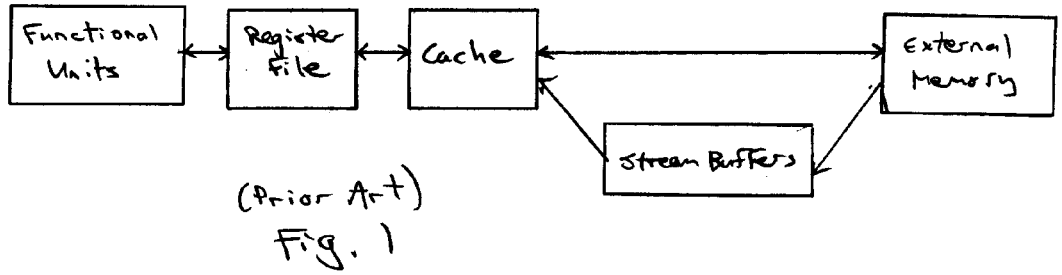
FIG. 1 is a block diagram of a conventional memory hierarchy including a stream buffer.
Figure 2:
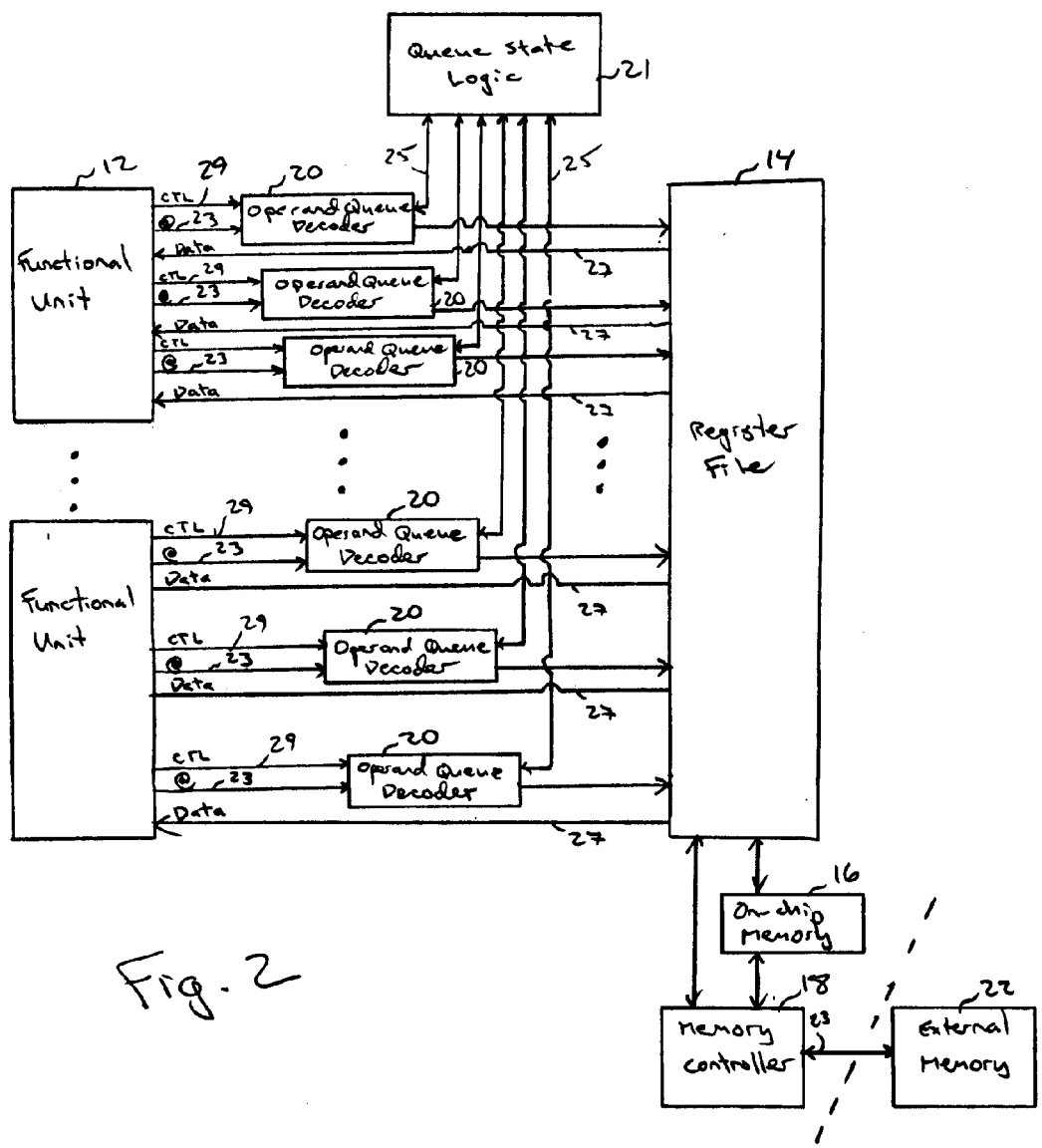
FIG. 2 is a block diagram of a processor having a register file with an operand queue extension according to an embodiment of this invention.

Referring to FIG. 2, a processor 10 includes one or more functional units 12, one or more register files 14, on-chip memory 16, a memory controller 18, one or more operand queue decoders 20, and queue state logic 21. The processor 10 typically is part of a computing system which includes external (e.g., off-chip) memory 22. External memory 22 is accessed through an input/output port 23 of the processor. The processor 10 performs computing tasks on data stored in the register file 14.

Figure 3:
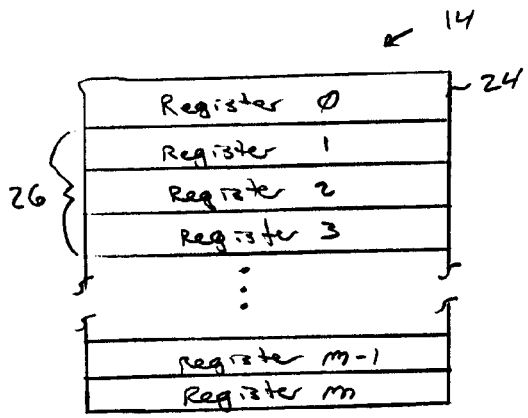
FIG. 3 is a diagram of a register file 14.

A typical processor instruction includes an instruction operand and one or more source operands. The source operands include data that is loaded from on-chip memory 16 or external memory 22 into the register file 14. The data is accessed from registers or operand queues of the register file 14. Referring to FIG. 3, the register file 14 is formed by a plurality of general purpose registers 24. The register file 14 is configured dynamically to provide a plurality of registers 24 and zero or more operand queues 26. The processor 10 performs a computation on the source operands and stores a result in a destination operand, (a register of the register file 14). The result then is moved into on-chip memory 16 and then output from the processor 10, (e.g., to external memory 22, to a peripheral device or some other output destination). In various embodiments the processor 10 is based on a single instruction multiple data ('SIMD') architecture, a VLIW architecture, a RISC architecture, or a combination of such architectures.

The register file 14 is formed by a plurality of general purpose registers 24. Each register 24 is addressable and accessible by one or more functional units 12. The register file includes a plurality of access ports. There is an access port for moving data into or out of the register file from on-chip memory 16 and external memory 22. In addition, for each functional unit 12, there is at least two access ports—one for a source operand and one for a destination operand. In a preferred embodiment the functional units 12 use two source operands and one destination operand. In such embodiment there are three access ports to the register file per functional unit 12—one for each source operand and one for the destination operand.

The register file 14 includes an operand queue extension. Specifically, the registers 24 are dynamically configured to serve as general purpose registers or as part of an operand queue 26. The operand queue 26 is implemented by including an operand queue decoder 20 in the register address lines between the functional unit and the register file. In addition queue state logic 21 is coupled to the operand queue decoders 20. For each access port of the register file 14, there is an operand queue decoder 20. For N access ports there an N operand queue decoders, (along with N sets of address lines 23, N sets of data lines 27, N communication paths 25 to the queue state logic, and N control lines 29).

Figure 4:
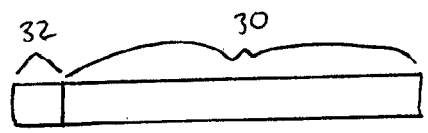
FIG. 4 is a diagram of an address for accessing the register file 14.

Each register 24 is configured as a general purpose register or part of an operand queue using a bit in its address line. For example, a 64-bit register typically has a 6-bit address. Instead, 7 bits are used. When a prescribed bit (e.g., the seventh bit) is a prescribed value (e.g., zero), the remaining six bits 30 (see FIG. 4) correspond to a register address, and identify which one of the 64 registers is addressed. When the prescribed bit, referred to herein as a configuration bit 32, indicates that the address is for an operand queue 26, the address is used to access the queue state logic 21 and determine the status information for the addressed operand queue 26. The queue state logic 21 stores the status information for each operand queue 26. The status information includes a head pointer, a tail pointer, a start address, an end address, and a number of vacancies for each operand queue. The size of the queue state logic 21 depends on the number of operand queues which are allowed to be defined at a given time. The queue state logic 21 is coupled to every operand queue decoder 20.

The operand queue decoder 20 receives the address value from a corresponding functional unit along address lines 23. If the value is a general purpose register address, then the corresponding register 24 is accessed. If instead the value refers to an operand queue 26, then the decoder 20 inquires with the queue state logic 21 along lines 25 for the current head or tail pointer of the particular queue (e.g., depending on whether a read or write instruction is being processed by the corresponding functional unit 12). Such pointer is the address for one of the registers 24 which is part of the operand queue 26. Such register then is accessed.

Figure 5:
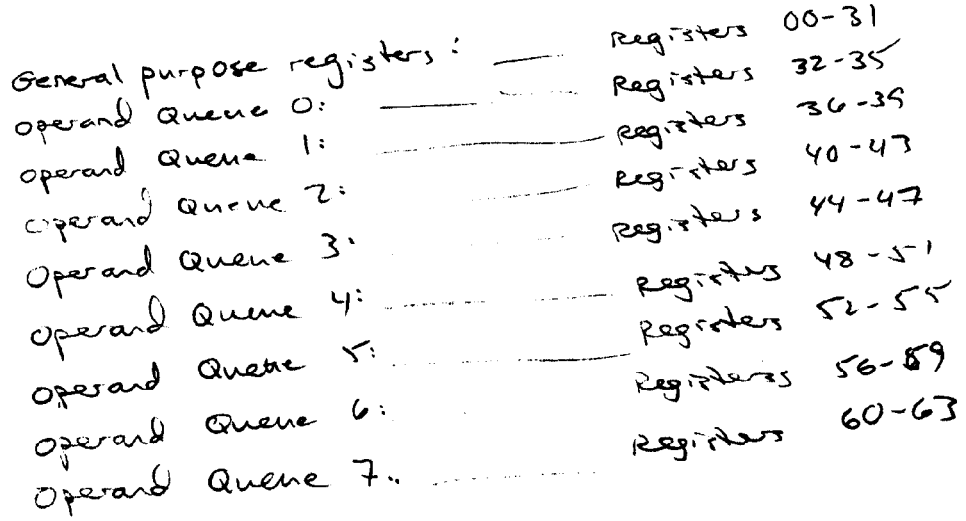
FIG. 5 is a diagram of an exemplary configuration of the register file into multiple registers and operand queues.
Figure 6:
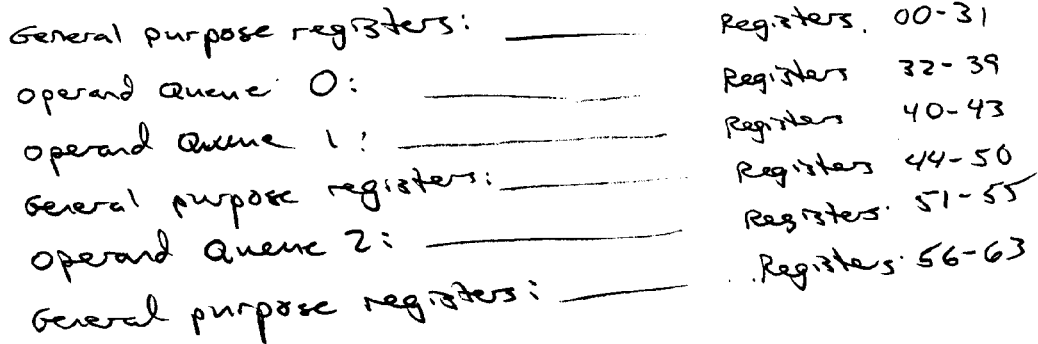
FIG. 6 is a diagram of another exemplary configuration of the register file into multiple registers and operand queues.

FIGS. 5–6 show exemplary configurations of the register file 14. These configurations are for illustrative purposes only. The actual configurations are defined by an application program designer as desired. Such configurations may change dynamically from program to program and within a given program. Each application computer program dynamically determines the configuration of the register file 14. Any given operand queue 26 spanning multiple registers in length uses consecutively addressed registers. However, different operand queues can be separated by registers which serve as general purpose registers and not part of an operand queue, as shown in FIG. 6. The size of any given operand queue is independent of the size selected for other operand queues and may vary from queue to queue.

The data stored in these queues 26 are mapped over the existing register file 14. While this approach may appear to restrict the number of registers 24 available to the programmer when the queues 26 are used, it provides a more flexible approach because the programmer can balance between the size of the operand queues 26 and the number of general purpose registers 24 available to the program. In addition, the existing datapath can be reused without the need for multiplexers to choose between a register file and queues. The registers can be arbitrarily partitioned among a plurality of operand queues and general purpose registers. The only restriction is that an individual queue occupy a consecutive set of registers.

In one embodiment the location and depth of a queue 26 within the register file 14 is set with a single instruction. When one of the multiple operand queues 26 is used as a source operand, the value is read from the head of the queue. Read accesses are either a POP (i.e., fetch the first (oldest) element of a queue, removing that element from the queue in the process) or a TOP operation (i.e., fetch the first (oldest) element of the queue while leaving that element in the queue in the process). If no value is available, the accessing functional unit 12 stalls and waits for the arrival of a new value. In one embodiment destination operands are written to the tail of an operand queue. If the queue is full, the functional unit stalls until the queue has space for the new value. Data is read from or written to the register file 14 by a functional unit 12 along data lines 27.

Although the same queue can be used as both source and destination operands, it is more common for one side of the queue to be accessed by the memory controller for transfer of on-chip or external memory data. If one of multiple queues 26 is used as a source operand, the memory controller 18 streams the data into the queue that is subsequently read out by the functional unit 12. If the queue 26 is used as a destination operand, then the functional unit 12 streams a set of results into the queue while the memory controller 18 reads these results from the queue and stores them in memory 16/22.

Although the data could come directly from the external memory 22, data transfer between the on-chip memory 16 and the operand queues 26 is more practical, since such a data transfer incurs fewer CPU stall cycles.

Meritorious and Advantageous Effects

By implementing the operand queues as a configuration of registers in the register file the size of the queue can be optimized for efficient use of silicon. Wasted area as for conventional stream buffers is avoided. The number of queues and the depth of each queue can vary, (e.g., one function may need three queues each with a depth of ten while another function may need five queues each with a depth of six). Furthermore, in the case where no queues are needed, there is no silicon sitting unused since the operand queue memory can be used for general-purpose registers.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A processor comprising:

a functional processing unit which executes processor instructions that specify at least one of a source operand and a destination operand;

a register file directly accessible by the functional processing unit which stores the source operand and destination operand specified by said processor instructions, the register file formed by a plurality of registers, wherein at least two registers of the plurality of registers are dynamically configurable to function at one time as general purpose registers and at another time as an operand queue, the operand queue directly accessible by the functional processing unit.

2. The processor of claim 1, further comprising:

a plurality of address lines for accessing the register, said plurality of address lines carrying a first plurality of address bits for addressing each one register of the plurality of registers in the register file and carrying at least one second address bit which identifies whether the register addressed by the first plurality of address bits serves as a general purpose register or part of the operand queue.

3. The processor of claim 2, further comprising:

an operand queue decoder coupled to the functional unit and the register file which decodes said plurality of address lines to select said addressed register for access as a general purpose register or part of said operand queue.

4. The processor of claim 3, further comprising:

a data input/output port for inputting data to the processor and outputting data from the processor; and a memory controller which controls input of data through said data input/output port into said register file and output of data from said register file through said input/output port.

5. The processor of claim 4, further comprising:

on-chip memory, wherein the memory controller controls input of data through said data input/output port into said on-chip memory and output of data from said on-chip memory through said input/output port, and wherein the memory controller controls movement of data between the register file and said on-chip memory.

6. The processor of claim 3, further comprising queue state logic for storing operand queue status information, the status information comprising a queue head pointer, a queue tail pointer, a queue start address, a queue end address, and a number of vacancies in the operand queue.

7. The processor of claim 6, in which the function of each one register of the plurality of registers is independently configurable to function as either one of a general purpose register or as part of an operand queue.

8. The processor of claim 1, in which the function of each one register of the plurality of registers is independently configurable to function as either one of a general purpose register or as part of an operand queue.

9. The processor of claim 1, wherein the register file is capable of being allocated into a plurality of operand queues, and wherein each one register of the plurality of registers is dynamically configurable to function at a given time as either one of a general purpose register or as part of one of the plurality of operand queues.

10. A method for dynamically configuring a register file of a processor, comprising the steps of:

processing a first instruction which allocates a first plurality of registers of the register file to serve as an operand queue, the operand queue having a queue head pointer, a queue tail pointer, a queue start address, and a queue end address;

processing a second instruction which reallocates at least one of the first plurality of registers into a general purpose register.

11. The method of claim 10, further comprising the steps of:

processing a third instruction which reallocates at least one register of the first plurality of registers which previously functioned as a general purpose register to function as part of the operand queue.

12. The method of claim 10, in which the operand queue is a first operand queue, and further comprising the steps of:

processing a third instruction which allocates a second plurality of registers of the register file to serve as a second operand queue, the second operand queue having a second queue head pointer, a second queue tail pointer, a second queue start address, and a second queue end address;

decoding a fourth instruction to identify an addressed register of the register file and to identify whether the addressed register is configured to serve as a general purpose register or as part of one of the operand queues.

13. The method of claim 12, wherein the step of processing the first instruction comprises allocating the first plurality of registers of the register file to serve as the first operand queue, and the step of processing the third instruction comprises allocating the second plurality of registers of the register file to serve as the second operand queue, wherein the first plurality of registers and the second plurality of registers together occupy a continuous address space.

14. The method of claim 12, wherein the step of processing the first instruction comprises allocating the first plurality of registers of the register file to serve as the first operand queue, wherein the first plurality of registers occupy a first continuous address space, and wherein the step of processing the third instruction comprises allocating the second plurality of registers of the register file to serve as the second operand queue, wherein the second plurality of registers occupy a second continuous address space, the second continuous address space being discontinuous with the first continuous address space.

15. The method of claim 10, further comprising the step of:

moving data between a memory source external to the processor and the plurality of registers configured as the operand queue.

16. The method of claim 10, further comprising the steps of:

directly accessing data from the plurality of registers configured as the operand queue by a functional processing unit of the processor.

17. A method for dynamically configuring a register file of a processor, comprising the steps of:

accessing a first register of a plurality of registers in the register file as a general purpose register during a portion of a computer program executed by the processor; and dynamically reallocating the first register to be part of an operand queue in response to a processed instruction.

18. The method of claim 17, wherein the step of dynamically reallocating comprises decoding a register address within a program instruction to identify the function of the first register as being part of the operand queue, the program instruction also specifying an address of a data operand to be stored in the operand queue.

19. The method of claim 17, further comprising the steps of:

accessing a second register of the plurality of registers in the register file as part of the operand queue;

dynamically reallocating the second register to function as a general purpose register not part of the operand queue; and accessing the second register as the general purpose register.

20. A method for dynamically configuring a register file of a processor, comprising the steps of:
- accessing a register of a plurality of registers in the register file as part of an operand queue;
- dynamically reallocating the register to function as a general purpose register not part of the operand queue; and
- accessing the register as a general purpose register.

21. The method of claim 20, wherein the step of dynamically reallocating comprises decoding a register address within a program instruction to identify the function of the first register as being part of the operand queue, the program instruction also specifying an address of a data operand to be stored in the operand queue.

* * * * *